US006559861B1

(12) United States Patent
Kennelly et al.

(10) Patent No.: US 6,559,861 B1
(45) Date of Patent: May 6, 2003

(54) DISPLAYING COMPUTER INTERFACES IN MULTIPLE LANGUAGES

(75) Inventors: Richard J. Kennelly, Maynard, MA (US); Peter E. Donahue, North Chelmsford, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/264,949

(22) Filed: Mar. 9, 1999

(51) Int. Cl.$^7$ ................................. G09G 5/00
(52) U.S. Cl. .................. 345/703; 345/744; 345/733; 345/765; 345/467
(58) Field of Search .................. 345/326, 329, 345/333, 334, 335, 352, 195, 467, 471, 192, 733, 764, 765, 744, 810, 703; 707/513, 536, 542; 704/8

(56) References Cited

U.S. PATENT DOCUMENTS

| | | | | |
|---|---|---|---|---|
| 4,731,735 A | * | 3/1988 | Borgendale et al. | 707/4 |
| 5,416,903 A | * | 5/1995 | Malcom | 345/333 |
| 5,499,335 A | * | 3/1996 | Silver et al. | 345/340 |
| 5,546,521 A | * | 8/1996 | Martinez | 345/711 |
| 5,630,131 A | * | 5/1997 | Palevich et al. | 717/1 |
| 5,917,484 A | * | 6/1999 | Mullaney | 345/333 |
| 5,974,372 A | * | 10/1999 | Barnes et al. | 704/8 |
| 6,025,836 A | * | 2/2000 | McBride | 345/326 |
| 6,073,090 A | * | 6/2000 | Fortune et al. | 704/8 |
| 6,182,099 B1 | * | 1/2001 | Nakasato | 707/536 |

OTHER PUBLICATIONS

Web page, Mitsubishi Electric Corporate Website, http://www.mitsubishi.com/, Mar. 9, 1999, (All references AK–AN were downloaded and printed using Netscape Navigator and an HP printer).
Web page, Mitsubishi Electric Corporate Website, http://www.melco.co.jp/, Mar. 9, 1999 linked to reference AK via the "Japanese" icon on http://www.mitsubishi.com/.
Web page, Mitsubishi Electric Corporate Website, http://www.melco.co.jp/index_e.htm, Mar. 9, 1999 linked to reference AL via the "English Site" icon on http://www.melco.co.jp/.
Web page, Mitsubishi Electric Corporate Website, http://www.mitsubishi.com/ghp_japan/home.htm, Mar. 9, 1999 linked to reference AK via the "English" icon on http://www.mitsubishi.com/.

* cited by examiner

Primary Examiner—John Cabeca
Assistant Examiner—Kieu D. Vu
(74) Attorney, Agent, or Firm—Steubing McGuinness & Manaras LLP

(57) ABSTRACT

An apparatus and method for displaying a page of a user interface of computer system in multiple languages. The computer system includes a memory that contains a plurality of string values that correspond to text in different languages. A memory object represents a page of the user interface and includes a set of variables formatted to be associated with string values. A processor selectively associates the variables with the string values that correspond to the language selected by the user.

29 Claims, 8 Drawing Sheets

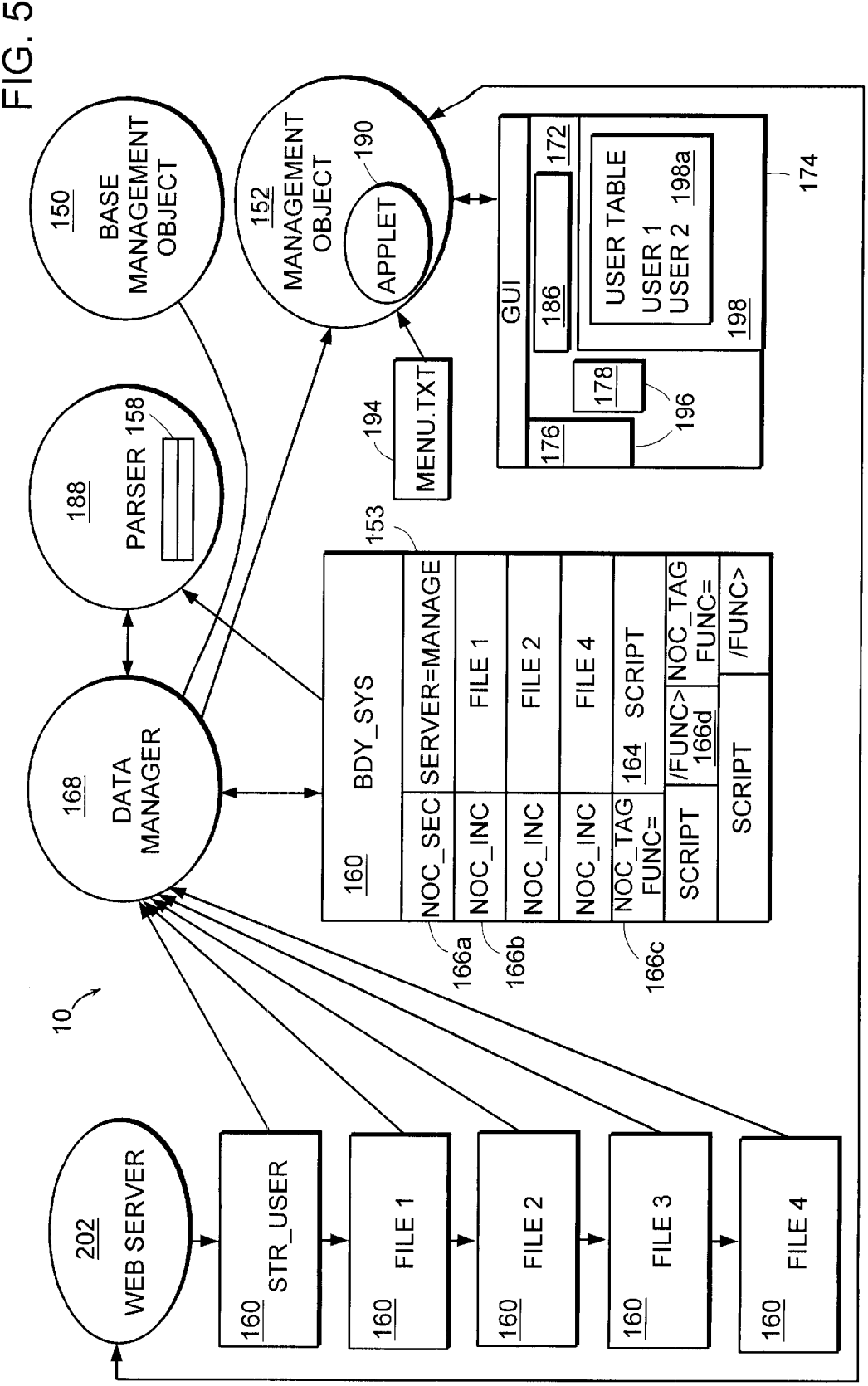

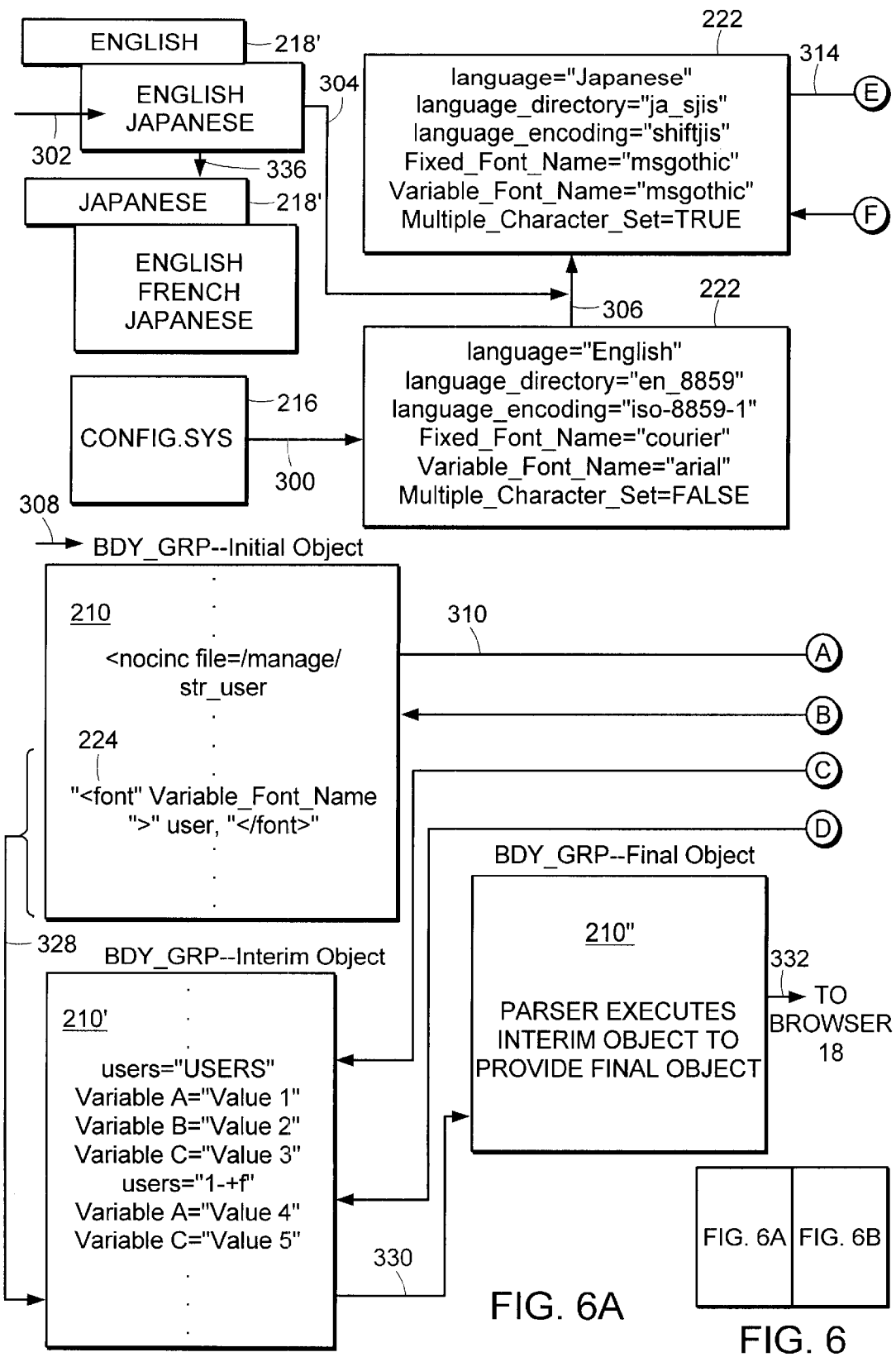

DISPLAYING COMPUTER INTERFACES IN MULTIPLE LANGUAGES

BACKGROUND

This invention relates to displaying computer user interfaces and, particularly, to displaying graphical user interfaces in multiple languages.

Some computer systems, including systems having web servers, are able to display graphical user interfaces in multiple languages. However, to support multiple languages, existing systems may store and present different sets of pages for each language. Furthermore, existing systems may transfer a user to a different location where the different set of pages are stored, e.g., through an alternate universal resource locator (URL). In such systems, the structure or layout of different sets of pages corresponding to the languages may vary. The new URL may transfer the user to a different server that generates the interface and is, e.g., in a different country.

Because the structure of pages in different languages may differ, each user may not see the same information. Also, to implement changes, an administrator may need to update many different instances of a page at one time. In addition, if the foreign language pages are maintained on a remote server, a local area network may not have access to the server having the foreign language pages.

SUMMARY

One aspect of the invention is a computer system having a user interface. The computer system includes a memory and a processor. The memory further includes a plurality of string values stored in the memory. The string values correspond to respective languages. A memory object that represents the user interface is resident in the memory. The memory object includes a set of variables formatted to be associated with the string values.

The processor selectively associates variables with string values that correspond to the selected language.

Embodiments of this aspect of the invention include one or more of the following features.

The user interface includes a set of pages that are represented by a set of corresponding management objects. The pages conform to a standard generalized markup language.

The memory stores a set of data files that include string values. The data files reside in subdirectories of a root directory, the subdirectories correspond to the languages. A master data file contains a computer instruction that causes the computer system to process one of the data files in the subdirectories. The processor reads a string value from a default language directory and associates the string value with a variable. If a language other than the default language is selected, the processor reads another string value corresponding to the selected language and associates the other string value with the variable.

In a web-based system producing a graphical user interface, an STML programming object may include a variable, which represents, e.g., encoding parameters or fonts, that the system associates with language values to produce a page of an interface in different languages.

Each embodiment within the scope of the claims may include one or more of the following advantages.

A computer system may display a single page of a computer interface in multiple languages. Each page of the interface may include the same general structure regardless of which language is presented. The pages of the interface may be synchronized between languages. The same information can be presented regardless of which language is chosen. When making changes to a page, an administrator may update only a single instance of a page rather than multiple instances of a representative page, one page for each supported language. An administrator can add additional languages while the system is generating the interface. An administrator may make changes to pages non-invasively by transferring updated files to the system while the system is generating the interface. An administrator may make changes to pages dynamically. A page will always be able to display text in a base language, e.g., English, even if the text is a new addition to the page and the text has not yet been translated.

BRIEF DESCRIPTION OF THE DRAWINGS

The foregoing features and other aspects of the invention will be described in further detail by the accompanying drawings, in which:

FIG. 5 is a block diagram showing the parsing of a set of data files to provide a management object;

DETAILED DESCRIPTION

Figure 1:
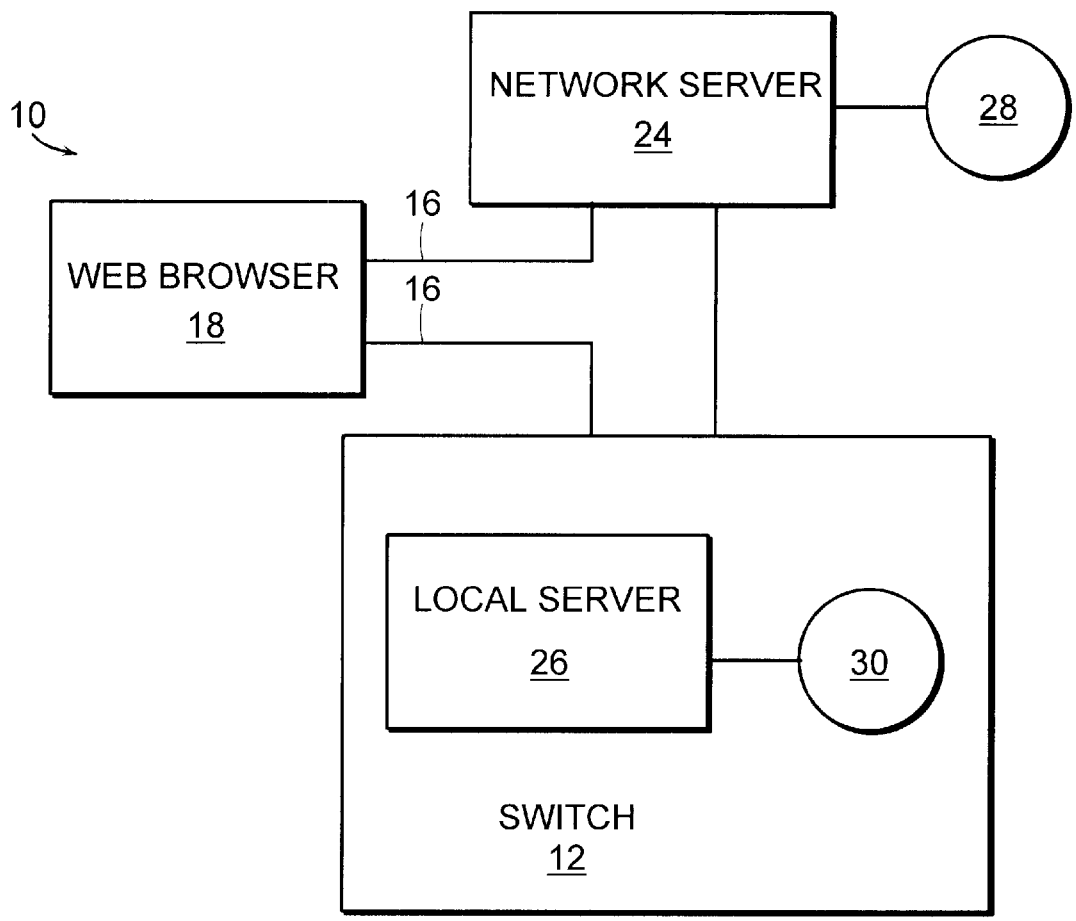
FIG. 1 is a block diagram of a networked computer system.

Referring now to FIG. 1, a web-based computer system 10 includes several types of connections that allow a user to access the system. Computer system 10, which is one example of many possible implementations of embodiments within the scope of the claims, provides a user interface in one of several languages that the user selects.

Networked computer system includes a network packet switch 12 that carries data over a network. Switch 12 is coupled to a network server 24. Alternatively, switch 12 can interface with a local server 26. In either case, server 24 or local server 26 each respectively accesses a database 28 (stored remotely) or a database 30 (stored locally).

A user interfaces with databases 28, 30 through a graphical user interface (GUI), which is one possible form of the network interface. For example, web browser 18 provides the GUI to the user through a network connection 16. One preferred GUI is provided by using a language that is compatible with a standard generalized markup language (SGML). For example, system uses a hypertext markup language (HTML), one version of an SGML, to provide pages of the interface.

Figure 2:
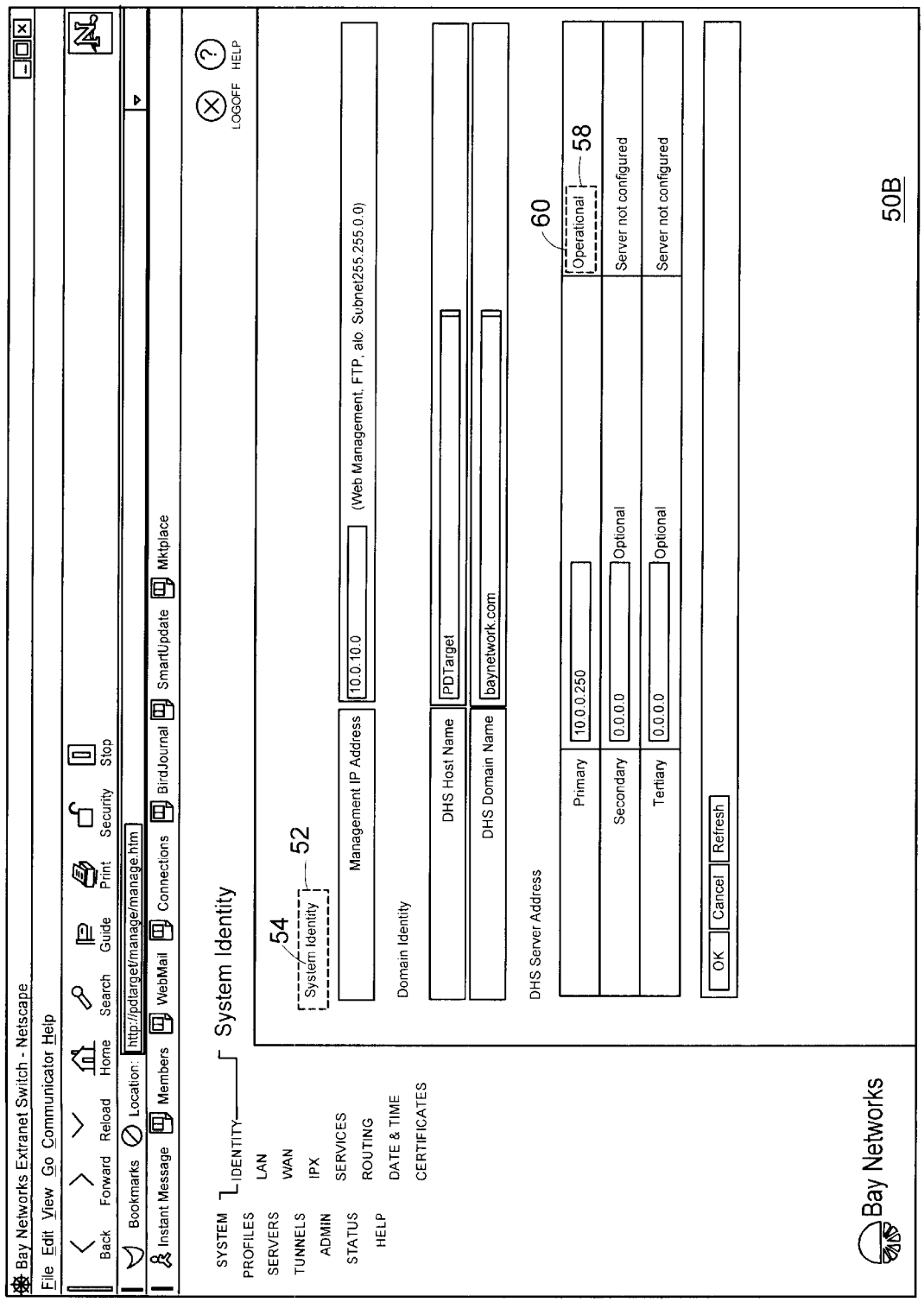
FIG. 2 is a diagram of a typical page of a user interface that the computer system of FIG. 1 displays in English.
Figure 3:
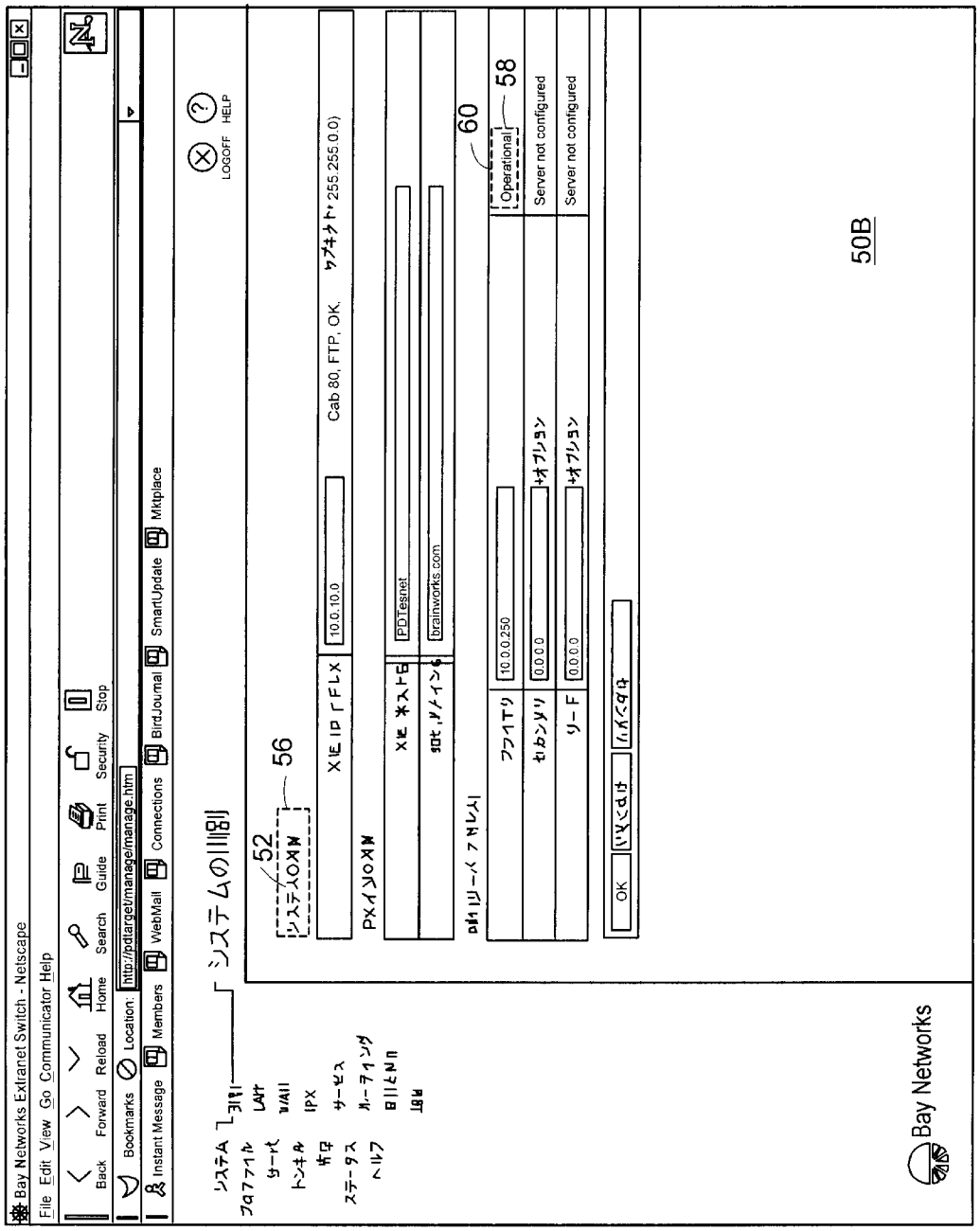
FIG. 3 is a diagram of the page of FIG. 2 that the computer system displays in a different language, e.g., Japanese.

Referring also to FIGS. 2 and 3, system displays a page 50 of the GUI interface in two versions, an English page 50*a* (FIG. 2) and a Japanese page 50*b* (FIG. 3). System 10 produces each displayed page 50*a*, 50*b* from a common management object that represents a common master page. Therefore, English page 50*a* is essentially the same page as Japanese page 50*b*, except that system 10 displays the text of page 50*a* in English and the text of page 50*b* in Japanese.

For example, a variable 52 (shown graphically for illustration) corresponds to a location on page 50*a*. System 10 assigns a string value 54 (FIG. 2), e.g., "system identity", to variable 52 when the user selects page 50*a* in the English language. Alternatively, if the user selects the Japanese language, system 10 will assign an alternate value 56 (FIG. 3), which includes Japanese characters, to variable 52. Similarly, system 10 will assign string values to all the remaining variables of page 50. However, if a corresponding string value is unavailable in Japanese, e.g., as seen for a variable 58, an English string value 60 remains assigned to variable 58 (as shown in FIGS. 2 and 3).

Figure 4:
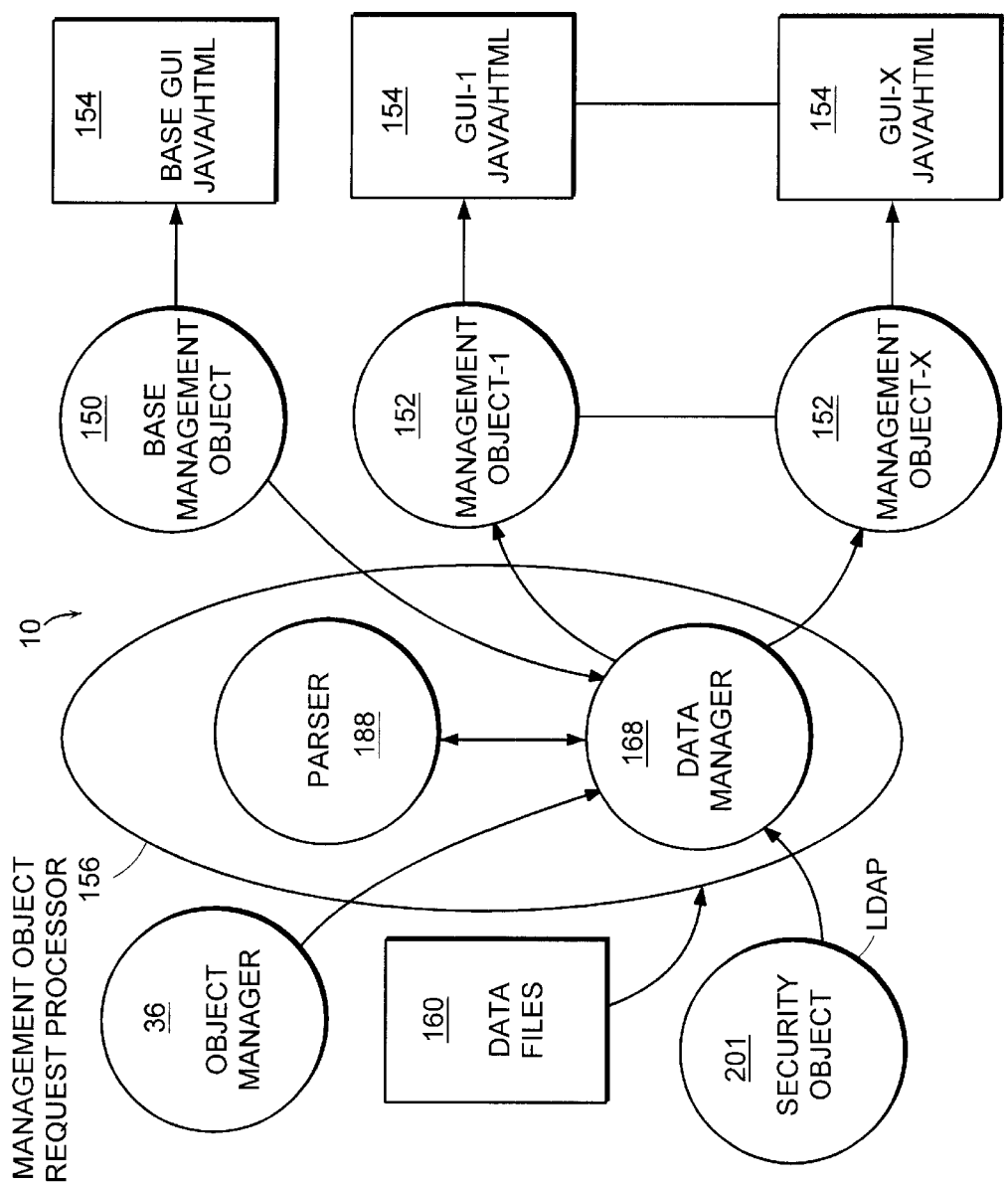
FIG. 4 is a block diagram of management objects produced by the system of FIG. 1.

Referring now to FIG. 4, system 10 generates and displays HTML web pages 154 from corresponding management objects 152. System produces management objects 152 by processing computer software instructions, e.g., a scripting language that servers 24, 26 support.

To display HTML web pages in different languages, network system 10 produces management objects 152 that incorporate data files 160. Data files 160 contain, e.g., strings of text. Network system 10 treats the strings of text as values, i.e., string values, and associates the string values with corresponding variables. The variables can reside in, e.g., different data files 160, a base management object 150, other objects or other data files. Network system 10 includes a data file directory structure (FIG. 6) that allows system 10 to incorporate different data files into management objects 152 that produce pages 154 of the network interface. The different data files 160 correspond to different languages.

Base management object 150 produces a set of tailored management objects 152. Management objects 152 are data structures that generate individual pages of the user interface of computer system 10. For example, management objects 152 produce graphic user interfaces (GUIs) 154 in the form of HTML web pages. GUIs 154 allow the user to access certain available functions by selecting various areas of page 154 with a keyboard or a mouse. Management objects 152 define, for example, the appearance of pages 154, the user-selectable functions available through pages 154, and the information presented to the user through pages 154.

Management objects 152 are produced by a management object request processor 156. Network system 10 generates management object request processor 156 when a user initially requests one of pages 154 to establish a session. Management object request processor 156 is a memory resident object that exists throughout the session, i.e., from the time the user requests page 154 until the time the user logs out or is logged out. To produce management objects 152, management object request processor 156 interfaces with an object manager 36, a security object 201, a set of data files 160, and base management object 150 and management objects 152.

Referring also to FIG. 5, management object request processor 156 includes a data manager 168 and a parser 188. Request processor 156 contains a set of variables 158 that parser 188 populates with attributes of the user. Variables 158 allow management object request processor 156 to produce a user specific interface from a set of generally available data files 160 and base management object 150. Management object request processor 156 combines data from data files 160 with base management object 150, which acts as a template to provide management objects 152. Management object request processor 156 uses variables 158 to establish user-specific rules that govern the generation of management objects 152 and, subsequently, govern the operation of the interface.

Network system 10 provides a graphical interface. Through the web page, the user requests management object 152 either through a menu or by directly typing the address of the page that the user desires to access. Management object request processor 156 processes the request.

When the user is logged in, management object request processor 156 begins parsing data files 160. Management object request processor 156 parses data files containing attributes of the user. Data files 160 are typically data files 160, such as STR_USER, that predominately contain string values 163. Management object request processor 156 uses string values 163 of data files 160 to set variables 158 in parser 188.

Management object request processor 156 provides management objects 152 to provide a user-specific interface that is based on specific attributes defined for the user. Management object request processor 156 parses additional data files 160 (e.g., BDY_SYS, File 1, File, 2 and File 4) according to rules defined by variables 158 and by base management object 150.

To determine attributes 152 of the user and, subsequently, provide management objects, data manager 168 and parser 188 analyze data files 160. Data manager 168 reads files 160 from a disk and scans files 160. Data manager 168 searches for information such as string values 163, text, HTML, scripts 164, and tags 166. If data manager 168 encounters certain types of information in data file 160 that does not need to be parsed, e.g., text or HTML, data manager 168 reserves the data and does not transfer the data to management object request processor 156. If data manager 168 encounters information in data file 160 that must be parsed, e.g., scripts 164, data manager 168 transfers the information to management object request processor 156.

Information, which management object request processor 156 must process is indicated by tags 166. Tags 166 provide a signal to data manager 168 that different types of data are included. In the present embodiment, data files 160 contain at least three types of tags 166: security tags 166*a* (e.g., "noc_sec"), server side include tags 166*b* (e.g., "noc_inc"), and script tags 166*c* (e.g, "noc_tag func" and "11/func>"). Security tags 166*a*, e.g., noc_sec tags 166, communicate the level of security access that is required for the user to access the information in data files 160. Server side include tags 166*b*, e.g., noc_inc tags, communicate which data file 160 the management object request processor 156 will read and analyze. Script tags 166*c*, e.g., noc_tag func, indicate that the information following script tag 166*c* and preceding the end script tag 166*d*, e.g., "/func>", is a script 164.

When data manager 168 encounters a tag 166, data manager 168 determines the type of tag 166 and acts appropriately. If data manager 168 encounters security tag 166*a*, data manager 168 analyzes security tag 166*a* and the associated string value 163, e.g., noc_sec and "server= manage", to determine the security attributes of the file. If data manager 168 encounters one of script tags 166*c*, e.g., "noc_tag func", data manager 168 transfers script 164 that lies between script tag 166*c* and end script tag 166*d*, e.g., /func>, to parser 188. If data manager 168 encounters server side include tag 166*b*, e.g., noc_inc, data manager 168 calls the associated file name, e.g., "File 1", and immediately begins examining the new data file 160 before completing the examination of the current file 160, e.g., BDY_SYS.

As an example, after the user logs in successfully and when the user requests a web page such as BDY_SYS, data manager 168 will read and examine the base data file 160. Data manager 168 encounters server side include tag 166*b* that references a startup file 160, e.g., STR_USER. Data manager 168 reads startup data file 160 and analyzes the data, again looking for tags 166. In STR_USER, most of the data are string values 163 that reside in the startup data file 160 as a script 164 located between script tags 166*c*, 166*d*. String values 163 represent variable assignment pairs, e.g., str_username="user name". Parser 188 parses values 163 into the proper variables 158 of management object request processor 156.

With the proper variables 158 set from the startup data file 160, data manager 168 scans data files 160 for scripts 164, or other information, within data files 160. Data manager 168 transfers scripts 164 to parser 188.

When parser 188 receives a script 164, script 164 provides instructions to parser 188. Parser 188 parses scripts 164, and subsequently organizes a response based on scripts 164. Parser 188 returns the response to data manager 168.

For example, script 164 can indicate that, if a user has a particular attribute, such as a level of access privileges equivalent to "manage", network system 10 should display a feature, such as a user table. Parser 188 reads script 164, examines the value associated with the attributes, and, if the attribute is a value that allows access, calls for the function. The function may be called as an object, or the function may be embedded in script 164 that parser 188 is examining.

As parser 188 analyzes script 164, parser 188 may request data from object manager 36 (shown in FIG. 4) or set data in object manager 36. For example, if parser 188 requests data from object manager 36, parser 188 typically incorporates the data from object manager 36 into a portion of GUI 154. Object manager 36 also provides other objects, such as base management object 150.

As parser 188 analyzes script 164, parser 188 organizes the response. The response is a block of text derived from script 164. Parser 188 transfers the response to data manager 168. Typically, the response is a block of HTML instructions. Data manager 168 combines the response and the reserved data, such as the reserved text or the reserved HTML. The combination of the reserved data and the response from parser 188 are output as a Web page 154 of the interface.

In this way, all data files are analyzed by data manager 168 and parser 188. Based on the attributes of the user, management object request processor 156 creates management objects 152. In the example above, variables 158 are populated by string values 163 that represent the attributes, such as the user identification, the user organization, or the user group. However, management object request processor 156 contains other types of variables 158 such as integer variables to indicate the number of seconds before the session time-out or boolean variables indicating whether a particular filter is enabled. The non-string variables 158 are populated by non-string values 163 in scripts 164. Data manager 168 transfers scripts 164 containing non-string values 163 to parser 188 from data files 160.

Management object request processor 156 presets many of variables 158 within parser 188. Thus, the attributes of the user are available, through variables 158 of parser 188, either to network system 10 or to another computer system that may be connected to network system 10. Thus, the attributes define the administrative functions available to the user from network system 10. Also, the attributes define the functions available to the user through network system 10.

The attributes associated with the user define, in part, a set of rules which govern the entire session. In essence, the attributes allow management object request processor 156 to parse data files 160 and determine, based on the rules defined in the attributes, the scripts 164, base management objects 150, other objects or other data, which functions to include in management objects 152. Thus, network system 10 dynamically provides the interface by tailoring pages 154, through the customized management object 152, to the user.

Attributes of each user may define various account types, a session timeout value, priority levels, percent connection capacity, destination addresses, destination ports, system 10 filters which are invoked during a session, user identification and password information, and a variety of other information. The attributes assigned produce a set of rules that govern each user's interaction with network system 10 and with networked computer system 10 communicating through system 10.

Further, network system 10 dynamically provides a set of management objects 152 using the process illustrated in FIGS. 4 and 5. Network system 10 incorporates a set of base management objects 150 that define a corresponding set of management objects 152. As described above in conjunction with FIG. 5, the single base management object 150 defines one management object 152, which, in turn, defines one user-specific page 154. However, system 10 provides many additional possible approaches. For example, one base management object 150 can define several management objects 152 for the user. Several base management objects 150 can be combined to define one management object 152 or several management objects 152. In addition, two different management objects 150 can define similar management objects 152 for different users. Other combinations are possible.

Typically, however, management request processor 156 will provide one management object 152 based on one base management object 150. Thus, as each user navigates through the interface, the user has a standardized view that is similar in appearance to each user, even though the functions base management object 152 incorporates into the user-specific interfaces will vary from user to user. In addition, the appearance of pages 154 is not dependent on the hardware topography. Thus, pages 154 will have the same appearance regardless of whether the user accesses system 10 from the private port side or the public port side.

Figure 6B:
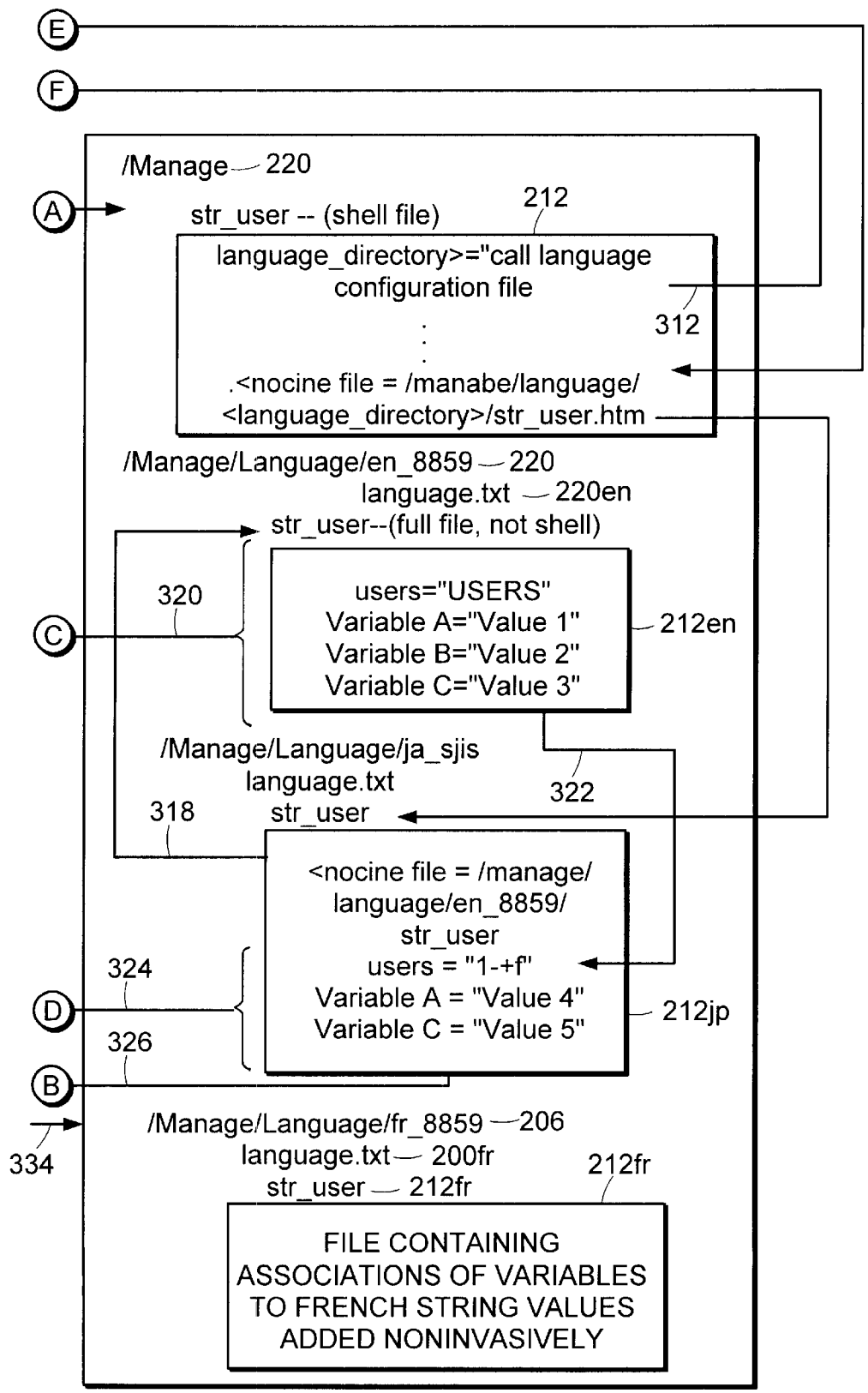
FIG. 6 is a flow diagram illustrating the operation of the system of FIG. 1.

Referring to FIG. 6, the customized management objects 152, as describe above, can produce HTML web pages, or other interfaces, in different languages. Many implementations are possible. For example, language data files can be stored in a directory structure having a root directory 220 that contains three subdirectories 204, 205, 206.

System displays text on pages of the network interface by associating text with variables. For example, data files in subdirectories 204, 205, 206 contain "variable=text" associations in which the same variable, e.g., users, is associated with different text in different subdirectories. Thus, by choosing the appropriate "variable=text" association, system 10 can produce the same page in different languages.

The "variable=text" associations reside in full data files, e.g., STR_USER, stored in directories 204, 205, 206. A shell file, also called STR_USER, resides in root directory 220 and provides scripts which allow system 10 to determine the selected language and the associated language parameters, e.g., encoding and fonts.

To populate the page of the interface with text, an initial object file 210, e.g., BDY_GRP, contains computer instructions, e.g., HTML code, that are used to produce the page of an interface. Management object request processor 156 sets the variables to string values 163 (FIG. 4) that represent the text of the page. Depending on the implementation, the variables may include variables 158 that are set in parser 188, or the variables may be variables associated with, e.g., management objects 152, base management object 150, data files 160, or other data or object files.

When a user engages the interface of system 10, system 10 displays the interface either in a default language or in a language that the user chose and saved during a previous session. Typically, system 10 initially selects English as the default language. The user can select a different language through menu choices displayed on a menu 176 (FIG. 7) at the left side of a page 208 of the interface.

Each subdirectory 204, 205, 206 contains a unique set of string values, in the form of "variable=text" associations, that correspond to the variables used to produce a page of the interface. The variables of the master data files, e.g., users, are defined in the subdirectories 204, 205, 206 via the "variable=text" associations. Ultimately, system 10 will use the appropriate "variable=text" association to associate the value representing the selected language with the variable in the management objects.

For example, to produce pages in English, management object request processor 156 calls the corresponding language data file 212en, i.e., the English version of STR_USER, from the corresponding subdirectory 204, e.g., "/en_8859". Language data file STR_USER in subdirectory 204 contains all the string values 163 that management request processor 156 uses as text when producing a page of the interface. Management request processor 156 associates all of the variables of the page with string values in the english language data files 212en.

If the english language is selected, the page of the interface is complete when management request processor parses all of language data files 212en, 214en. However, if the user selects a language other than the default language, e.g., French or Japanese rather than English, management object request processor 156 proceeds to call the corresponding language data file 212fr or 212jp, i.e., the French or Japanese versions of STR_USER, depending on which language is selected, from the corresponding subdirectories 204, 206, e.g., "/fr_8859" or "/ja_sjis". Thus, when a language other than the default language, e.g., English, is selected, the default subdirectory, e.g., en_8859, provides an overlay that ensures that each variable is associated with a value. Subsequently, management request processor 156 associates values from the language data files 212, 214 of the selected language subdirectory, e.g., jp_sjis, with the variables. Thus, system 10 ensures that each variable contains a text string even if a translation of that string is not immediately available. The variable retains the originally associated string from the default subdirectory, e.g., en_8859. Even though the user may not be able to read the text field, the user is aware of the presence of information in each field, which otherwise may be, e.g., indistinguishable from the background of the page.

Thus, system 10 produces synchronous pages, i.e., pages that are identical except for different sting values 163 that depend on the selected language. Therefore, all users interface with sets of pages having an identical structure. Also, an administrator can change the network interface by changing a single page rather than changing all similar pages written in a different language. If subdirectories 204, 206 contain translations for each string variable, all string values 163 of the default language will be overwritten. However, if some translations are not available, the string variables corresponding to the missing translations will not be overwritten and will continue to contain string values 163 from english language directory 204 containing the default language.

In essence, language data files 212en, 212jp, 212fr, STR_USER, are overlays that the system 10 places over the values from the default language data file. Therefore, system 10 maintains uniform and synchronous pages regardless of which language the user selects. The pages of the interface can be changed dynamically while system 10 generates the interface without preventing access to the system 10 or certain pages of the network interface. The administrator can add an additional language data file in a new subdirectory or the administrator can change the string values in existing language data files. Because management object request processor 156 includes the language data files from different subdirectories, changes to the text can be made by replacing one or more of the files in the subdirectories. Thus, the user continues to have access to the associated page while the administrator updates the system. When the file is replaced, the generic page will include the updated string values when the user selects the page again.

For example, as shown in FIG. 6., a web browser can produce a page of an interface using a computer object generated by associating variables with values that correspond to a selected language. In FIG. 6, the steps of an exemplary implementation are labeled starting with step 300 and progressing in sequence by even numbers, e.g., 302, 304, etc.

At startup, system 10 reads a data file 216, e.g., config.sys. (Step 300) The file 216 contains default language parameters 222 that system 10 stores in memory while running. System stores the parameters 222 in a portion of memory that is used to generate all pages of the interface. Thus, the value of the language data pervades all pages of the network interface. Based on language parameters 222, management object request processor 156 will use only data from a language data file that coincides with the selected language. Thus, all pages of the interface will be displayed in the chosen language until the user again selects page 208 and selects a different language.

As illustrated, the default language is English and the default parameters 222 correspond to the English language. Thus, at startup, the value of parameters 222 are:

```
Language = "English"
Language_directory = EN_8859
Language_encoding = ISO-8859-1
Fixed_Font_Name = "courier"
Variable_Font_Name = "arial"
Multiple_Character_Set = "FALSE"
```

Figure 7:
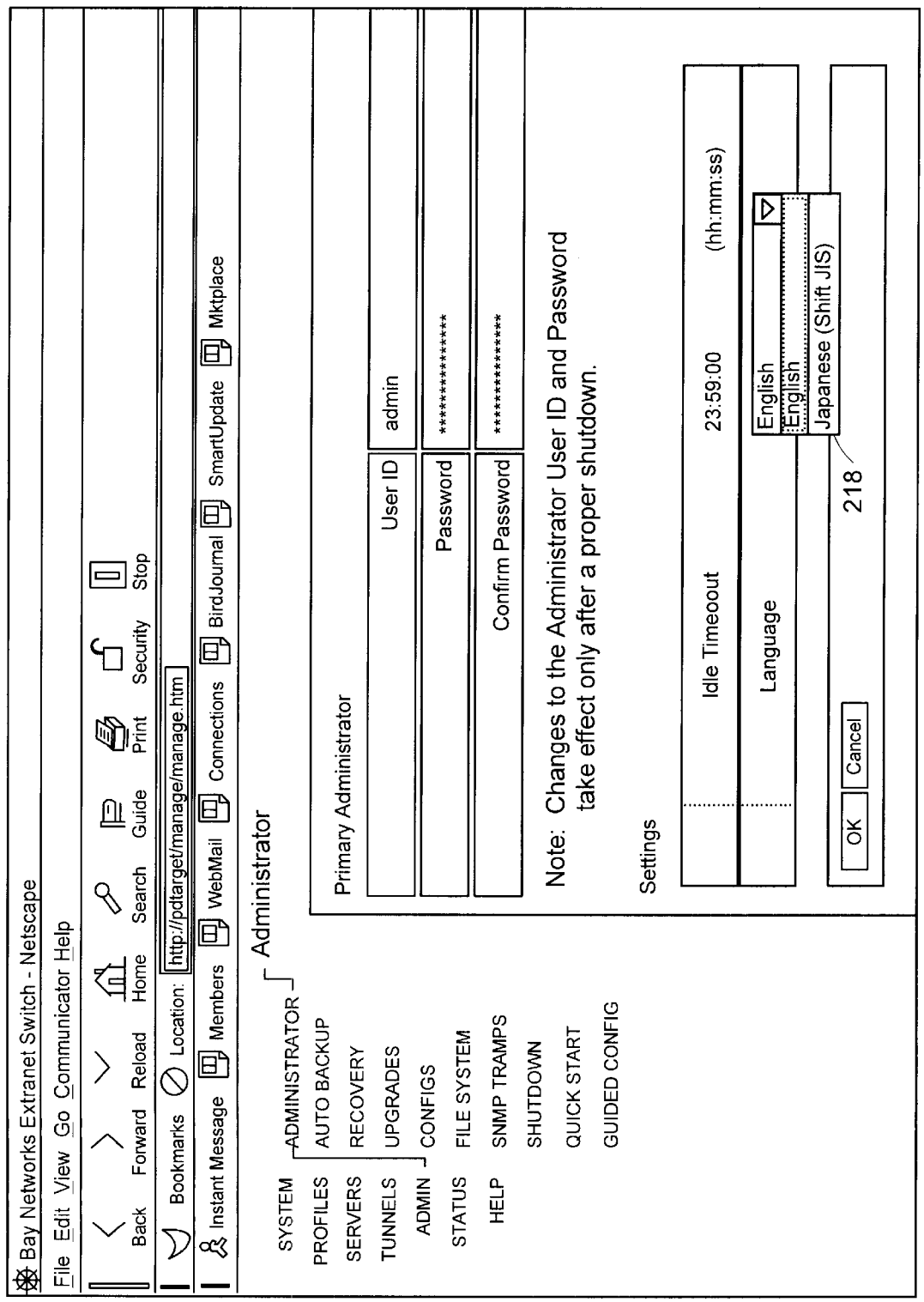
FIG. 7 is a diagram of an administrator page of the user interface generated by the system of FIG. 1, the page allows a user to select from a set of languages.

Referring to both FIGS. 6 and 7, when a user accesses system 10 and selects an Administrator page 208 (FIG. 7), logic within the management object that produces page 208 causes management object request processor 156 (FIG. 4) to traverse language directories 204, 205, 206 and determine which languages are available to the user. Each time the user selects Administrator page 208, management object request processor 156 reads all the subdirectories under root directory 220 and looks for the existence of corresponding data files 220en, 220jp, 220fr, e.g., language.txt. The data files 220en, 220jp, 220fr contain information regarding the corresponding languages. When management object request processor 156 locates a language.txt file in a subdirectory, processor 156 presumes that system 10 supports the corresponding language.

Subsequently, system 10 displays each of the available languages in a drop down menu box 218 of page 208. (FIG. 7) Drop down menu box 218 presents all available languages in the selected language, e.g., English. Alternatively, drop down menu box 218 may present each available language in that language, e.g., drop down menu box 218 could present the English option in the English language and the Japanese option in the Japanese language.

The user can select the desired language in box 218, e.g., with a mouse. If the user selects a new language other than the default language (step 302), such as japanese, system 10 executes HTML script of page 208 and overrides the existing parameters 222. (Step 304) For example, the parameters 222 become (step 306):

---
Language = "Japanese (Shift-JIS)"
Language_directory = JA_SJIS
Language_encoding = Shift_JIS
Fixed_Font_Name = "MS Gothic"
Variable_Font_Name = "MS Gothic"
Multiple_Character_Set = "TRUE"
---

System can periodically save these values to the config.sys file 216 or prompt the user to save the new values if desired.

After the user selects a new language (or continues to use the default language), the user may request a new page, e.g., the page BDY_GRP represented by data file 210. (Step 308) When the user requests BDY_GRP, management object request processor 156 reads BDY_GRP into memory as an initial programming object that includes, e.g., a scripting language such as PEARL, TCL, or a customized scripting language. Subsequently, management object request processor 156 executes the instructions of the initial object 210 to generate a final object 210" that web browser 18 (FIG. 1) uses to provide the requested page. (Steps 310–332)

For example, as processor 156 executes the instructions of initial object 310, processor 156 encounters a "nocinc" tag that causes processor 156 to include data file 212, STR_USER, from root directory 220. (Step 310) STR_USER is a shell file that contains scripts that determine which language has been selected. Processor 156 executes the instructions of data file 212, which call the language configuration file 222 to determine which language is selected. (Step 312) Processor 156 accesses the variable language_directory, which is associated with the value "ja_sjis". (Step 314) Subsequently, when processor 156 encounters the include tag of data file 212, processor 156 substitutes the value "ja_sjis" for the variable <language_directory>, and includes the data file 212*jp*, STR_USER, from the Japanese language subdirectory 205. (Step 316)

The first line of data file 212*jp* is also an include tag that includes the data file 212*en*, STR_USER, from the default language directory 204, e.g., English. (Step 318) Although many implementations are possible, in the described implementation, each language data file 212*jp*, 212*fr* in the subdirectories 205, 206 initially includes the default language data file 212*en*. Processor 156 executes the default language data file 212*en* to ensure that all variables are associated with values. Subsequently, processor 156 overrides the default values with values corresponding to the selected language. This redundancy ensures that each variable is associated with a value, even if a translated value is not available in the selected language. In essence, the implementation of system 10 presumes that all variables are likely to be associated with values of the default language, and that translations of the default values may not always be available or may be delayed because additional time may be required to translate the default values into other languages.

For example, processor 156 executes the instructions of data file 212*en* and writes the results, e.g., via a set command, to an interim object 210' of BDY_GRP. (Step 320) Processor 156 then jumps back to data file 212*jp* to finish executing the instructions of data file 212*jp*. (Step 322) Processor 156 also writes the results of data file 212*jp* to interim object 210' following the results previously written from the default data file 212*en*. (Step 324) Similarly, when processor 156 completes the execution of the language data files 212*en*, 212*jp*, processor 156 jumps back to initial object 210 (step 326), finishes executing initial object 210, and writes the results of initial object 210 to interim object 210' (step 328).

When processor 156 completes the execution of initial object 210, processor 156 executes interim object 210' and writes the results to a final object 210" of BDY_GRP. (Step 330) As processor 156 executes interim object 210', processor 156 associates the variables of the STR_USER data files 212*en*, 212*jp* with japanese text. For example, as processor 156 progresses sequentially through interim object 210', processor 156 overrides the value "USERS" and associates the variable "users" with japanese text representing the word "users". Similarly, processor 156 overrides "Value 1" of Variable A and "Value 3" of Variable C, and associates variables "A" and "C" with "Value 4" and "Value 5" respectively. However, processor 156 does not override "Value 2", which represents English text, because data file 212*jp* does not contain a corresponding value in Japanese. Thus, processor 156 associates variable "B" with an English text value.

System is able to associate variables with different languages because the instructions relating to the language parameters of the data file 210, e.g., BDY_GRP, also are variables rather than specific values coded into an object or data file. For example, initial object 210 contains an instruction 224 that specifies the font for a particular variable. However, rather than specifying the font by name, initial object 210 uses a variable, "Variable_Font Name", that reads the desired font from the language parameters 222. Thus, if the value is Japanese text, the variable can specify Japanese language parameters. In the present embodiment, when a translated value is not available, e.g., as in the case of Variable B of interim object 210', system 10 is able to write english text using the japanese language parameters 222. However, if the default language is Japanese, additional logic would be required to associate Japanese language parameters with the default Japanese text values.

When processor 156 completes the execution of interim object 210' and, thus, generates final object 210", web browser 18 (FIG. 1) uses final object 210" to produce the requested page of the interface. (Step 332) Computer system 10 provides multiple languages both non-invasively and dynamically. The structure of root directory 220 allows an administrator to add additional subdirectories or alter files within existing directories 220, 204, 205, 206 while system 10 generates pages of the user interface. (Step 334) If an administrator creates an additional subdirectory in root directory 220, e.g., french subdirectory 206, the administrator can include another selectable language by transferring the files into the new subdirectory 206, e.g., via an FTP command. The user will see the addition language choice when the user again selects Administrator page 208. For example, the directory structure shown in FIG. 6 includes three subdirectories 204, 205, 206 that correspond to the English, French and Japanese languages respectively. In contrast, drop down menu box 218 of Administrator page 208 (FIG. 7) includes only the English and Japanese languages. In effect, the administrator added the additional subdirectory 206, "fr_8859", after the user initially selected page 208. If the user again selects page 208, system 10 will examine the additional subdirectory 206. Because data file 220fr, LANGUAGE.TXT, resides in French subdirectory 206, system 10 will include "French" in drop down menu box 218 as well as "English" and "Japanese", all in alphabetical order. The dynamic and noninvasive addition of French subdirectory 206 is also illustrated in the transition from a menu box 218' to a menu box 218" (FIG. 6). System generates menu box 218" when the user requests page 208 (FIG. 7) a second time. (Step 336)

In the example illustrated in FIG. 6, the generic page BDY_GRP serves as the only template for all variations of that page. Thus, system 10 does not store various data files that produce similar pages in different languages. Also, the system 10 does not connect a user through a different resource locator, e.g., a URL, when the user selects a different language. Rather, the system 10 incorporates different sets of string values into the generic page.

For preferred configurations of system 10, the form of the text in the language data files is transparent to master page 50 (FIGS. 2 and 3). Master page 50 does not incorporate differences in presentation of the language. For example, English text will read from left to right. However, in order for a language, such as Hebrew, to read from right to left, the system 10 operator must input the characters of the string value backwards. Also, system 10 will not display other languages, such as Japanese, in a vertical direction. Alternatively, however, management object request processor 156 could include variables that allow the string values to be further formatted to account for differences in language format.

Alignment problems that may arise by placing different sets of characters in the same locations in master page 50 are handled by HTML automatically. For example, translating a phrase from English to Japanese may result in a different number of characters. If the translated phrase contains more Japanese characters than the English phrase, which is the default language, the string may not be correctly linked to the designated location on the page of the network interface and the string may become misaligned. However, HTML dynamically accommodates such misalignment.

Other embodiments are within the scope of the following claims.

Computer system 10 does not address the input of data in response to the interface. In other words, though the language of the interface may be changed, any data that the user inputs via the keyboard will continue to be based on the character set of the keyboard. Any data input through the keyboard, such as name and address data, is passed to, and processed by, the core system. However, embodiments within the scope of the claims could include a computer system 10 that accommodates inputs in different languages.

Generally, network servers use scripting languages that support server side include tags that are similar to the noc_inc tags disclosed herein. Thus, though some adaptation may be required between systems, the use of server side include tags and other aspects of these scripting languages conforms to nearly an industry standard that allows embodiments within the scope of the claims to be implemented on a variety of network systems in a variety of applications.

Rather than utilizing a complex network computer system 10 with many components such as system 10 described above, embodiments within the scope of the claims can be implemented on a wide variety of computer systems including simple computer systems, e.g., computer systems having a single network server.

As described above, computer system 10 tailors interfaces to specific users based on the attributes assigned to that user. However, embodiments within the scope of the claims can include systems having other configurations. For example, embodiments within the scope of the claims may include generic interfaces that are not tailored to specific users. Also, a computer system 10 could provide pages using predetermined object files, rather than dynamically creating management objects from a base management object as described above.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer system having a user interface, the computer system comprising:
   a memory having;
   a plurality of suing values stored in the memory, a first one of the string values corresponding to a first language and a second one of the string values corresponding to a second language, wherein the strings are dynamic and may be altered while the computer system 10 is generating the user interface;
   a memory object resident in the memory, the memory object representing the user interface, the memory object including a set of variables associated with string values of the plurality of string values; and
   a processor for selectively associating a variable of the set of variables with one of the string values, the processor associating the variable with the first string value if the first language is selected, and the processor associating the variable with the second string value if the second language is selected.

2. The computer system of claim 1 wherein the user interface further includes a set of pages, the management object representing at least a portion of the set of pages.

3. The computer system of claim 2 wherein the pages of the set conform to a standard generalized markup language.

4. The computer system of claim 1 further comprising a set of data files stored in the memory, the data files including the plurality of string values.

5. The computer system of claim 4 further comprising a first data file of the set of data files including the first string variable, and a second data file of the set of data files including the second string variable.

6. The computer system of claim 4 further comprising a master data file that contains a computer instruction capable of causing the computer system to process a data file of the set of data files.

7. The computer system of claim 1 wherein the memory stores first and second directories respectively.

8. The computer system of claim 7 wherein the first directory is a first subdirectory of a root directory, and the second directory is a second subdirectory of the root directory.

9. The computer system of claim 7 wherein the first subdirectory contains the first string value, and the second directory contains the second string value.

10. The computer system of claim 7 further comprising a set of computer instructions capable of causing the computer system to:
read the first string value from the first directory of memory and associate the first string value with the variable.

11. The computer system of claim 10 wherein the computer instructions are capable of causing the computer system to:
selectively read the second string value from the second directory; and
associate the second string value with the variable if the second language is selected.

12. A method of producing a user interface of a computer system in multiple languages, comprising:
storing a set of string values in a computer memory, a first string value of the set corresponding to a first language, a second string value of the set corresponding to a second language, wherein the step of storing includes the step of modifying one of the first string or second string;
generating a computer object including instructions representing a page of the user interface;
selectively associating a variable of the computer object with a first string value if the first language is selected, and with a second string value if the second language is selected;
displaying the page of the interface based on the computer object;
altering at least one of the string values in the memory while the computer system is generating the interface; and
associating the altered string value with the variable if the corresponding language is chosen and if the page is requested.

13. The method of claim 12 wherein the first and second string values are stored in first and second directories of memory respectively.

14. The method of claim 13 further comprising reading the first string from the first directory in memory, and, if the second language is selected, reading the second string value from the second directory in memory.

15. The method of claim 13 wherein the first directory is a first subdirectory of a root directory, and the second directory is a second subdirectory of the root directory.

16. The method of claim 12 further comprising:
adding a third string value to the memory, the third string value corresponding to a third language; and
associating the third string value with the variable if the third language is chosen and if the page is requested.

17. The method of claim 16 wherein adding the third string further comprises adding the third string value to the memory while the computer system is generating the interface.

18. The method of claim 12 further comprising storing a first data file that includes the first string value in the memory.

19. The method of claim 18 further comprising storing a second data file that includes the second string value in the memory, the first data file being stored in a first directory, the second data file being stored in a second directory.

20. The method of claim 19 further comprising:
reading the first data file to associate the first string value with the variable; and
reading the second data file, if the second language is selected, to associate the second string value with the variable and override the first string value.

21. The method of claim 19 further comprising storing a third data file corresponding to a third language in a third directory.

22. The method of claim 21 further comprising:
altering at least one of the data files;
storing the altered data file;
associating the string value of the altered data file with the variable if the corresponding language is selected and if the page is selected.

23. A computer system comprising:
a computer readable medium containing a set of computer instructions capable of producing a user interface, the computer instructions being capable of causing the computer system to:
associate a variable with a language value of a set of Language values, the set of language values corresponding to a set of languages, the set of languages modifiable during the generation of the user interface by the computer system; and
produce the user interface in different languages of the set of languages based on the value associated with the variable.

24. The computer system of claim 23 wherein the variable represents an encoding parameter of the language.

25. The computer system of claim 23 wherein the variable represents a font of the language.

26. The computer system of claim 23 wherein the user interface is a graphical user interface.

27. The computer system of claim 23 wherein the computer system is a web-based computer system.

28. The computer system of claim 27 wherein the page of the user interface is an HTML page.

29. The computer system of claim 23 wherein the computer instructions comprise a programming object including the variable, the programming object capable of causing the computer system to:
produce a page of the user interface in different languages of the set of languages based on the value associated with the variable.

* * * * *